(12) United States Patent
May et al.

(10) Patent No.: US 9,509,581 B2
(45) Date of Patent: Nov. 29, 2016

(54) METHODS FOR MONITORING DATA TRAFFIC IN A GATEWAY DEVICE

(71) Applicant: THOMSON LICENSING, Issy de Moulineaux (FR)

(72) Inventors: Martin May, Paris (FR); Lucas Di Cioccio, Vanves (FR); Renata Teixeira, Paris (FR); Christian Kreibich, Gilching (DE)

(73) Assignee: THOMSON LICENSING, Issy-les-Moulineaux (FR)

( * ) Notice: Subject to any disclaimer, the term of this patent is extended or adjusted under 35 U.S.C. 154(b) by 166 days.

(21) Appl. No.: 14/366,833

(22) PCT Filed: Dec. 18, 2012

(86) PCT No.: PCT/EP2012/076027
§ 371 (c)(1),
(2) Date: Jun. 19, 2014

(87) PCT Pub. No.: WO2013/092634
PCT Pub. Date: Jun. 27, 2013

(65) Prior Publication Data
US 2014/0362719 A1 Dec. 11, 2014

(30) Foreign Application Priority Data

Dec. 20, 2011 (EP) ...................................... 11290584
Jan. 30, 2012 (EP) ...................................... 12305112

(51) Int. Cl.
*H04L 12/26* (2006.01)
*H04L 29/06* (2006.01)
*H04L 12/28* (2006.01)
(52) U.S. Cl.
CPC ....... *H04L 43/0829* (2013.01); *H04L 12/2834* (2013.01); *H04L 63/1408* (2013.01)

(58) Field of Classification Search
None
See application file for complete search history.

(56) References Cited

U.S. PATENT DOCUMENTS

| | | | |
|---|---|---|---|
| 6,188,674 B1 | 2/2001 | Chen et al. | |
| 6,678,250 B1 * | 1/2004 | Grabelsky | ............... H04L 43/06 370/241 |
| 6,791,958 B2 | 9/2004 | Spear et al. | |
| 6,839,328 B2 | 1/2005 | Lau et al. | |
| 7,016,309 B1 * | 3/2006 | Rathi | .................. H04L 43/0835 370/231 |

(Continued)

FOREIGN PATENT DOCUMENTS

| | | | |
|---|---|---|---|
| CN | 102118277 | 7/2011 | |
| TR | WO 2007086813 A1 * | 8/2007 | ............. H04L 12/14 |
| WO | WO2007086813 | 8/2007 | |

OTHER PUBLICATIONS

Characterizing home netowrks with HomeNet Profiler DiCioccio et al. Technicolor Technical Report, Sep. 2011.*

(Continued)

*Primary Examiner* — Chirag Shah
*Assistant Examiner* — Rina Pancholi
(74) *Attorney, Agent, or Firm* — Tutunjian & Bitetto, P.C.

(57) ABSTRACT

A method of monitoring data traffic across a gateway device connecting a first and a second networks includes comparing values obtained from data counters in the gateway device with defined amounts of data sent from the first to the second network or received from the second network in the first network. The method allows for detecting unauthorized or unwanted traffic as well as locating data loss in the first or second networks.

17 Claims, 4 Drawing Sheets

(56) References Cited

U.S. PATENT DOCUMENTS

| | | | | |
|---|---|---|---|---|
| 2002/0191594 A1* | 12/2002 | Itoh | ....................... | H04L 1/0002 370/352 |
| 2007/0016688 A1* | 1/2007 | Hester | ..................... | H04L 12/66 709/238 |
| 2012/0269086 A1 | 10/2012 | Yue et al. | | |
| 2013/0114616 A1* | 5/2013 | Oh | ..................... | H04L 12/2834 370/401 |

OTHER PUBLICATIONS

L. DiCioccio, R. Teixeira, C. Rosenberg: Characterizing home networks with HomeNet Profiler,Sep. 2011, the whole document.

L. DiCioccio et al: "Impact of Home Networks on End-to-End Performance:Controlled Experiments", Sep. 3, 2010, Retrieved from the Internet:the whole document.

Christian Kreibich et al: "Netalyzr: Illuminating the Edge Network",Proc. IMC, Oct. 2010, pp. 1-14.

Srikanth Sundaresan et al: "Broadband Internet Performance: A View From the Gateway", in Proc. ACM SiGCOMM, Aug. 2011.

Search Report Dated Jun. 5, 2013.

Aggarwal et al., "NetPrints: Diagnosing Home Network Misconfigurations Using Shared Knowledge", 6th USENIX Symposium on Networked Systems Design and Implementation, Boston, Massachusetts, USA, Apr. 22, 2009, pp. 1-16.

Bischof et al., "Crowdsourcing ISP Characterization to the Network Edge", ACM SIGCOMM 2011 W-MUST Workshop, Toronto, Ontario, Canada, Aug. 19, 2011, pp. 1-6.

Calvert et al., "Instrumenting Home Networks", ACM SIGCOMM Computer Communication Review, vol. 41, No. 1, Jan. 2011, pp. 84-89.

Chetty et al., "Why Is My Internet Slow?: Making Network Speeds Visible", ACM Conference on Human Factors in Computing Systems, Vancouver, British Columbia, Canada, May 7, 2011, pp. 1889-1898.

Dischinger et al., "Characterizing Residential Broadband Networks", ACM SIGCOMM Internet Measurement Conference 2007, San Diego, California, USA, Oct. 24, 2007, pp. 1-14.

Kreibich et al., "Netalyzr: Illuminating the Edge Network", ACM SIGCOMM Internet Measurement Conference 2010, Melbourne, Australia, Nov. 1, 2010, pp. 1-14.

Anonymous, "UPnP Specifications", http://upnp.org/sdcps-and-certification/standards/, Jan. 2012, pp. 1.

* cited by examiner

|  | WAN | |
|---|---|---|
|  | No loss | Loss |
| LAN No loss | 4 % | 48 % |
| LAN Loss | 5 % | 19 % |

METHODS FOR MONITORING DATA TRAFFIC IN A GATEWAY DEVICE

This application claims the benefit, under 35 U.S.C. §365 of International Application PCT/EP2012/076027, filed Dec. 18, 2012, which was published in accordance with PCT Article 21(2) on Jun. 27, 2013 in English and which claims the benefit of European patent application No. 11290584.9, filed Dec. 20, 2011 and European patent application No. 12305112.0, filed Jan. 30, 2012.

FIELD OF THE INVENTION

The invention pertains to home networks, in particular to networks that are not closely monitored, managed and maintained. In the following specification this kind of networks is referred to as home networks. However, the invention is applicable to all kind of networks having similar properties and using a gateway device for connecting a private network and the Internet.

BACKGROUND OF THE INVENTION

There is a general desire to obtain more information about home networks and the devices attached thereto in order to allow for a better identification and tracking of problems in such home networks through internet service providers, or ISPs. Acquiring such information by sending service personnel is unrealistic due to cost constraints. Also, setting up and maintaining or modifying such home networks is usually not done by trained service personnel. One important aspect, notably in wireless networks, is security, including preventing unauthorized or unwanted access. Not all users are aware of the threats resulting from unauthorized or unwanted access and can take appropriate measures against unauthorized or unwanted access to the home network through third parties. For example, such unauthorized or unwanted access may result in data traffic through a gateway device, which has to be paid for, or which may pertain to up- or downloading of illegal content.

SUMMARY OF THE INVENTION

The present invention provides methods, a network device and a gateway device that allow for tracing and monitoring traffic that is going through an Internet gateway, i.e. traffic directed from the home network to the Internet and vice versa, for detecting unauthorized or unwanted traffic and for locating packet loss in data traffic.

In accordance with a first aspect, the invention relates to a method of detecting unauthorized data traffic across a gateway device connecting a first and a second networks, including the following steps:
  a first network device attached to the first network sending a first query to the gateway device, requesting a first information about the status of a data counter provided in the gateway device;
  the first network device receiving the first requested information;
  the first network device transmitting a defined amount of data to the second network;
  the first network device sending a second query to the gateway device, requesting a second information about the status of the data counter provided in the gateway device;
  the first network device receiving the second requested information;
  the first network device determining a data amount from a difference between the first and second information;
  the first network device comparing the determined data amount with the defined amount of data transmitted; and
  in case the determined data amount differs from the defined amount of data, by a predetermined amount of data, the first network device providing an indication that unauthorized data traffic was detected.

Thus, according to this first aspect, for detecting an illegally connected device, e.g. a device connected via a wireless connection without authorization of the owner of the private network, the regular authorized traffic going through the gateway can be monitored in the gateway and can be compared with the traffic generated by authorized network devices. If the traffic actually measured at the gateway exceeds the expected traffic a corresponding information might be provided.

The terms traffic and amount of data, or data amount, are used interchangeably in this specification unless otherwise noted.

The inventive method can also be used for detecting misbehaving devices, i.e. devices not operating as expected by a user. Misconfiguration or software problems, including malware residing on a user's network device, e.g. a personal computer or internet tablet, could lead to unscheduled and unexpected data transfers to and from the Internet. The method in accordance with this first aspect of the present invention can detect such misbehavior.

In accordance with a second aspect, the invention concerns a method of locating packet loss in data traffic across a gateway device connecting a first and a second networks, including the following steps:
  a first network device attached to the first network sending a first query to the gateway device, requesting a first information about the status of a data counter provided in the gateway device;
  the first network device receiving the requested information;
  the first network device transmitting a defined amount of data to a second network device attached to the second network;
  the first network device sending a second query to the gateway device, requesting a second information about the status of the data counter provided in the gateway device;
  the first network device receiving the requested second information;
  the first network device determining a data amount from a difference between the first and second information;
  the first network device receiving, from the second network device, a message indicating an amount of data received;
  the first network device comparing the determined data amount with the amount of data reported received from the second network device and with the defined amount of data transmitted;
  in case the determined data amount is larger than the amount of data reported received from the second network device, by a predetermined amount of data, the first network device providing an indication that data loss in the second network was detected,
  in case the determined amount of data is smaller than the defined amount of data transmitted, the first network device providing an indication that data loss in the first network was detected.

In addition, according to a third aspect, the invention pertains to a method of locating packet loss in data traffic across a gateway device connecting a first and a second networks, including the following steps:

a first network device attached to the first network sending a first query to the gateway device, requesting a first information about the status of a data counter provided in the gateway device;

the first network device receiving the requested information;

the first network device transmitting a request to a second network device attached to the second network, triggering the second network device to send a defined amount of data;

the first network device receiving data in response to the request, and counting the amount of data received;

the first network device sending a second query to the gateway device, requesting a second information about the status of the data counter provided in the gateway device;

the first network device receiving the requested second information;

the first network device determining a data amount from a difference between the first and second information;

the first network device comparing the determined data amount with the defined amount of data requested from the second network device and with the amount of data received;

in case the determined data amount is larger than the amount of data received, by a predetermined amount of data, the first network device providing an indication that data loss in the first network was detected;

in case the determined data amount is smaller than the defined amount of data, by a predetermined amount of data, the first network device providing an indication that data loss in the second network was detected.

Thus, according to said second and third aspects, data packet loss can be located to occur in a first network (e.g. a local area network) or in a second network (e.g. a wide-area network) through sending to, or receiving from, a second network device (e.g. a server) attached to the second network defined numbers of data packets and comparing the number with data measured at the gateway.

One embodiment of the invention allows for accessing information about data traffic through a gateway even without the collaboration of the attached end devices and/or a user.

Preferably, the first network is a wired and/or wireless home network, and wherein the second network is the Internet.

In addition, the protocol for addressing the data counter in the gateway is advantageously compliant with the UPnP protocol.

Moreover, a link capacity value provided by the gateway is preferably compared to a measured end-to-end link capacity value, for determining a reliability value of the gateway's data counter.

In addition, a protocol-dependent overhead might advantageously be taken into account in case the data counter provides net data values rather than gross data values.

The present invention also concerns a network device having a network interface, a microprocessor, a program memory and a data memory, wherein the network device is adapted to perform one of the methods previously described.

Besides, the present invention is further related to a gateway device having a first and a second network interfaces connected to a first and a second networks and providing a connection between the first and second networks, the gateway device further having a microprocessor, a program memory and a data memory, wherein the gateway device is adapted to provide responses to queries from the network device as above mentioned in accordance with one of the methods previously described.

The present invention also concerns:

a system for detecting unauthorized data traffic across a gateway device connecting a first and a second networks, said system comprising a network device and a gateway device as above described;

a system for monitoring data traffic across a gateway device connecting a first and a second networks, said system comprising a network device and a gateway as above described.

BRIEF DESCRIPTION OF THE DRAWINGS

The invention will be better understood and illustrated by means of the following embodiment and execution examples, in no way limitative, with reference to the appended Figures on which.

In the Figures, like elements are referenced using like designators.

References disclosed in the description, the claims and the Figures may be provided independently or in any appropriate combination. Features may, where appropriate, be implemented in hardware, software, or a combination of the two.

Figure 2:
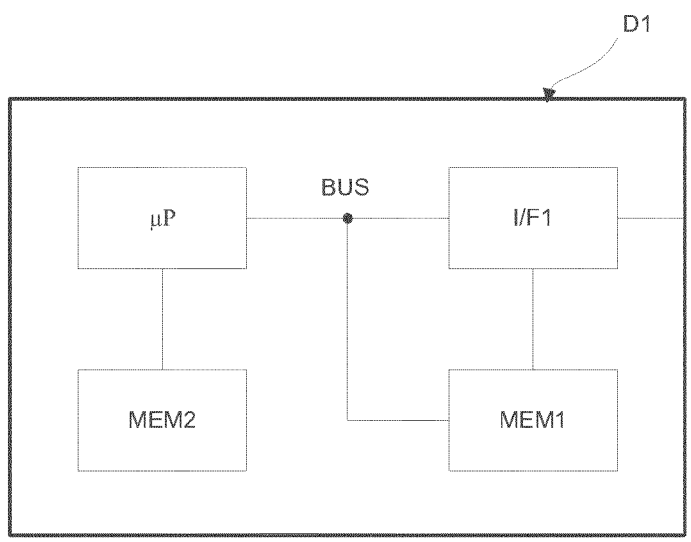
FIG. 2 shows an exemplary block diagram of a network device suitable for performing methods in accordance with the present invention.
Figure 3:
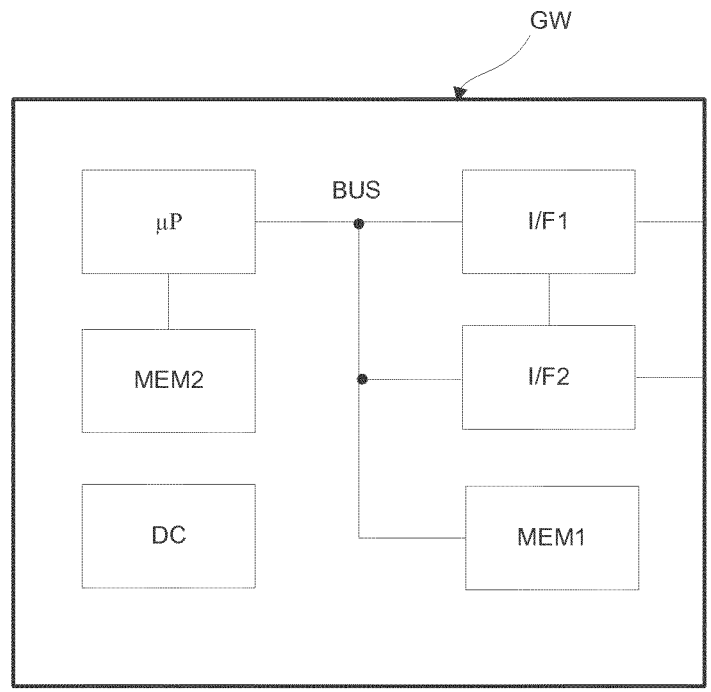
FIG. 3 shows an exemplary block diagram of a gateway suitable for performing methods in accordance with the present invention.

In addition, in FIGS. 2 and 3, the represented blocks are functional units, which can correspond to units physically separated or which can be included in a same physical unit. Namely, they could be developed in the form of software, hardware, or be implemented in one or several integrated circuits. For instance, these blocks or at least some of them can be grouped in a unique component or can constitute functionalities of a same software. In opposition, some blocks can eventually be divided into separate units.

DETAILED DESCRIPTION OF PREFERRED EMBODIMENTS

Figure 1:
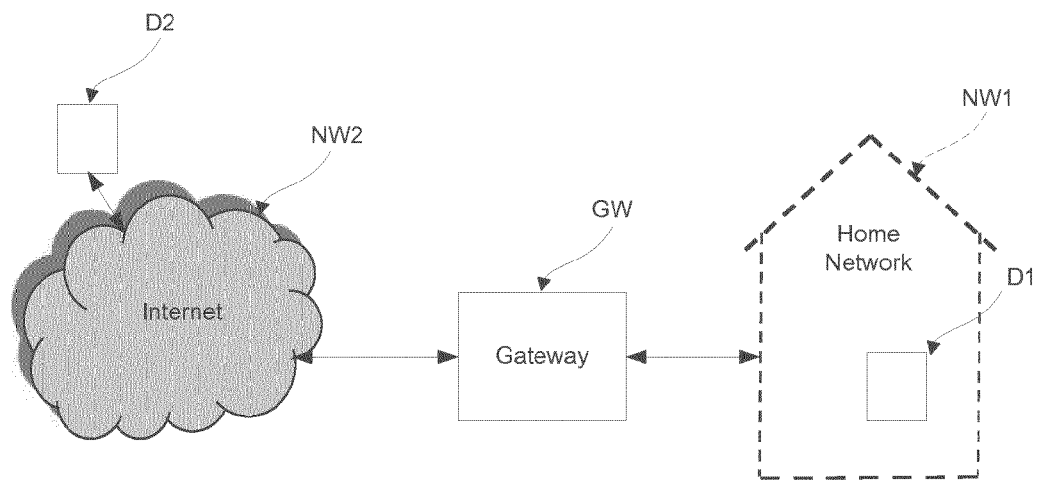
FIG. 1 shows a general setting in which the invention is applicable.

FIG. 1 shows a general, conventional setting in which the inventive methods are applicable. A first network NW1, e.g. a Large Area Network (shortly LAN) as a Home Network, is connected to a second network NW2, e.g. a Wide Area Network (shortly WAN) as Internet, via a gateway GW. A first network device D1 and a second network device D2 (e.g. a server) are respectively attached to the first and second networks NW1 and NW2.

FIG. 2 shows an exemplary block diagram of the home network device D1 suitable for performing methods in accordance with the present invention. A microprocessor µP is connected to a first network interface I/F1 and a first memory MEM1 via a connection bus BUS, e.g. PCI, PCIe, serial bus, and the like. First memory MEM1 includes hard disk drives, FLASH memory, EEPROM, solid state disk drives, and the like. First network interface I/F1 includes wired and/or wireless LAN interfaces, USB or IEEE1394 interfaces, and the like. Microprocessor µP, which may be a general purpose microprocessor, is also connected to a second memory MEM2, which includes random access memory, or RAM, as well as any other kind of memory from which program instructions can be run, e.g. NOR-Flash, SRAM, MRAM, SDRAM, and the like. The home network device D1 also comprises a measurement tool MT able to estimate the cross traffic from other devices (not shown) connected to the home network NW1.

In the context of the present application, cross traffic refers to supposedly unauthorized or unwanted data traffic going through the gateway GW, i.e. data traffic going from the home network to the Internet and vice versa without authorization. Authorization in this context refers to traffic generated by devices and/or software running on such devices that are authorized to transmit data to and receive data from the Internet NW2 via the gateway GW. The term Internet as used in this specification refers to any kind of network that is connected to the private or home network NW1 through the gateway GW.

FIG. 3 shows an exemplary block diagram of the gateway GW suitable for performing methods in accordance with the three aspects of the present invention. A microprocessor µP is connected to a first I/F1 and a second I/F2 network interfaces as well to a first memory MEM1 via a bus. The interfaces, memory and the bus may be of the same type as mentioned above for the network device D1. The second interface I/F2 may also include one or more of, inter alia, xDSL, cable, satellite, or optical interface capable of uni- or bi-directional data transmission. Microprocessor µP is further connected to a second memory MEM2 in a similar way as discussed in FIG. 2 further above.

Querying the status of a data counter DC provided in the gateway GW includes requesting a current count value of that counter DC. The counter DC may include one or more of a UPnP data counter, or a TCP/IP data counter, FTP data counter, and the like.

Program memory MEM2 includes one or more of random access memory, or RAM. Data memory includes one or more of Flash-memory, EEPROM, hard disk drive, solid state disk drive, optical memory and the like. Either memory may be organized in pages, blocks, sectors, registers, cylinders, heads, and the like.

Figure 4:
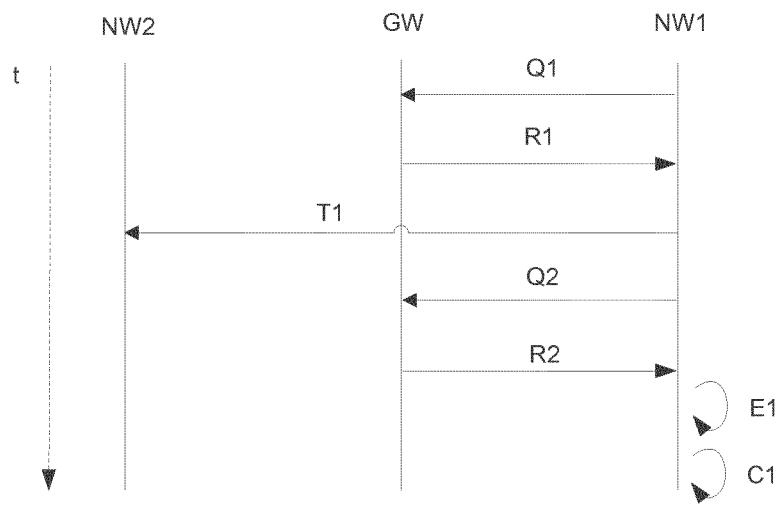
FIG. 4 exemplarily shows data traffic across a gateway in accordance with a method of detecting unauthorized data traffic compliant to a first aspect of the invention.

FIG. 4 exemplarily shows data traffic crossing the gateway GW according to a method of detecting unauthorized data traffic compliant to a first aspect of the invention. The measurement tool MT running on the home network device D1 estimates the cross traffic from other devices connected to the home network NW1 by querying the gateway's traffic counters DC.

In a first step Q1, the measurement tool MT of the network device D1 queries the gateway GW—e.g. via UPnP or any other appropriate query protocol—and requests (step R1) reporting the status of the traffic counters DC, specifically the traffic from the WAN interface I/F2. Then, the measurement tool MT sends (step T1) a defined amount of packets from the home network NW1 to any destination on the Internet NW2, counting the packets sent. After sending, the measurement tool MT queries (step Q2) the traffic counters DC of gateway GW again, and then receives (step R2) the new status of the traffic counters DC. It further determines (step E1) a data amount from the former and the new status of the data counters DC of the gateway GW, and then compares (step C1) the determined data amount with the defined amount of packets transmitted. When the two numbers are equal, no other traffic is detected on gateway GW, i.e. no cross traffic is running through gateway GW. If the number of packets (or bytes) is higher on the gateway side by a predetermined amount of data (which might be equal to zero), other sources from the home network NW1 sent traffic to the Internet NW2.

Figure 5:
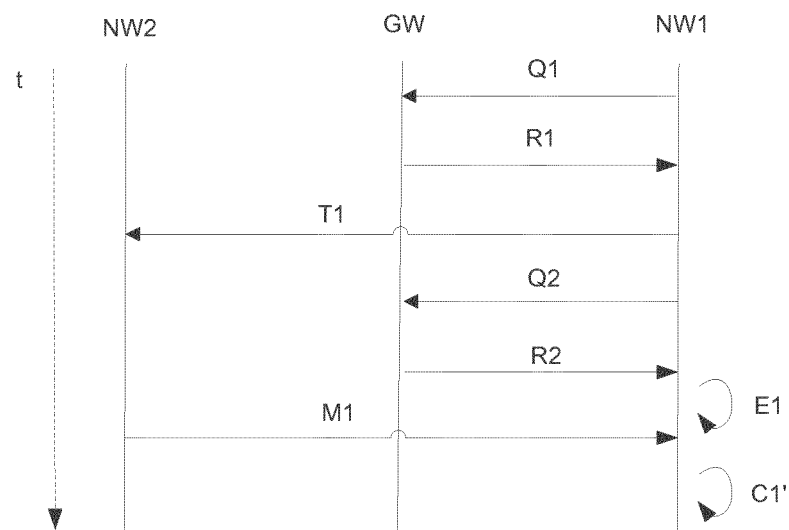
FIG. 5 exemplarily shows data traffic across the gateway in accordance with a method of locating packet loss in data traffic compliant to a second aspect of the invention.

FIG. 5 exemplarily show data traffic crossing the gateway GW according to a method of locating packet loss in data traffic compliant to a second aspect of the invention.

As illustrated on FIG. 5, the measurement tool MT implements the successive steps Q1, R1, T1, Q2, R2 and E1, as described in reference to FIG. 4. It then receives (step M1), from the server D2, a message indicating an amount of data received, and further compares (step C1') the determined data amount (transmitted in step T1), in one hand, with the amount of data reported received from the server D2 and, another hand, with the defined amount of data transmitted.

In case the determined data amount is larger than the amount of data reported received from the server D2, by a predetermined amount of data, the home network device D1 provides an indication that data loss in the Internet NW2 was detected.

In case the determined amount of data is smaller than the defined amount of data transmitted, the home network device D1 provides an indication that data loss in the first network NW1 was detected.

Figure 6:
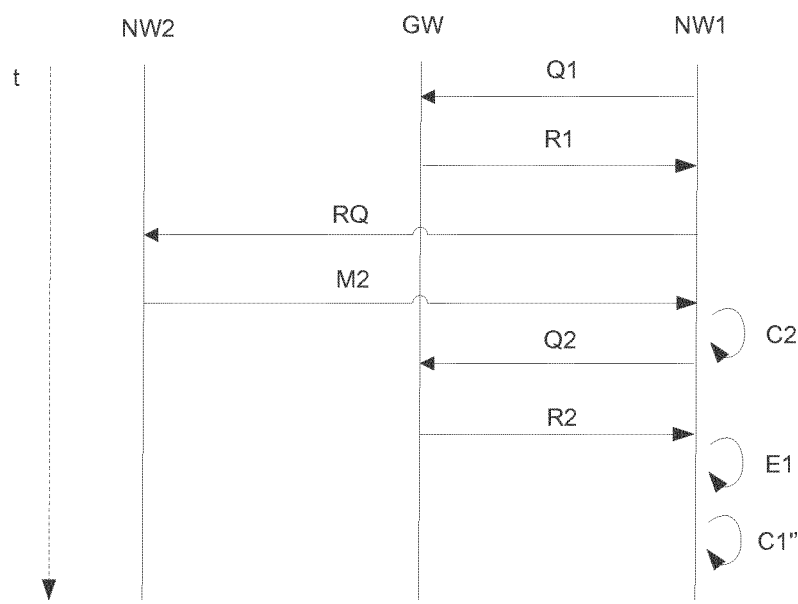
FIG. 6 exemplarily shows data traffic across the gateway in accordance with a method of locating packet loss in data traffic compliant to a third aspect of the invention.

FIG. 6 exemplarily show data traffic crossing the gateway GW according to a method of locating packet loss in data traffic compliant to a third aspect of the invention.

As illustrated on FIG. 6, the measurement tool MT performs the successive steps Q1 and R1, as previously described in reference to FIG. 4. Then, it sends a request (step RQ) to the server D2, triggering the latter to transmit a defined amount of data. In response, the home device D1 receives (step M2) data, and counts (step C2) the amount of data received. The measurement tool MT queries (step Q2) the traffic counters DC of gateway GW, and then receives (step R2) the new status of the traffic counters DC. It further determines (step E1) a data amount from the former and the new status of the data counters DC of the gateway GW to compare (step C1") the determined data amount, on one hand, with the defined amount of data requested from the server D2 and, on another hand, with the amount of data received.

In case the determined data amount is larger than the amount of data received, by a predetermined amount of data, the home network device D1 providing an indication that data loss in the home network NW1 was detected.

In case the determined data amount is smaller than the defined amount of data, by a predetermined amount of data, the home network device D1 providing an indication that data loss in the Internet NW2 was detected.

As mentioned further above, the gateway's traffic counters DC are also useful to differentiate packet loss in the home network NW1 from packet loss in the Internet NW2. To this end, the home device D1 sends data packets to the server D2, which is adapted to return the packets to the local network device D1, to provide a message indicating the number of packets received, or to send a defined number of packets in response to a corresponding request.

For example, in FIG. 5, for measuring the upstream bandwidth, a large number of packets from the home network device D1 may be used (step T1) to trigger a small downstream response from the server D2 (step M1), which may even merely contain the number of received packets.

In addition, in FIG. 6, for measuring the downstream bandwidth, a small request packet triggers (step RQ) a defined large number of packets to be sent from the server D2 attached to the Internet NW2 (step M2).

In both cases, again, the measurement tool MT counts the number of packets sent to and/or received from the server D2 during the capacity test, and also reads the data collected in the UPnP counters DC in the gateway GW.

In the upstream scenario of FIG. 5, packets are considered lost in the home network NW1 if the number of packets counted by the gateway GW is less than the number of packets sent from the home network device D1 to the server D2 attached to the Internet NW2.

In the downstream scenario of FIG. 6, packets are considered lost in the home network NW1 if the UPnP counter DC in the gateway GW counted a correct number of packets sent from the server D2 attached to the Internet NW2 in response to the triggering from the home network device D1, but the home network device D1 counts less than this defined number of packets.

Similarly, packets are considered lost in the Internet NW2 if the number of packets counted by the gateway GW is less than the defined number of packets sent from the server D2 attached to the Internet NW2 in response to the triggering from the home network device D1, or if the number of packets counted by the gateway GW is larger than the number of packets reported received by the server D2.

This inference could be incorrect if packets are dropped in the home network NW1, but at the same time traffic from another home device to the Internet increments the gateway's counters. This may be compensated for to some extent by considering data loss only in case the difference exceeds a predetermined percentage.

Thus, the methods in accordance with the first, second and third aspect of the invention include probing data counters DC provided in the gateway GW using a suitable protocol, e.g. Universal Plug and Play (shortly UPnP), injecting a defined data traffic across the gateway GW, and then probing the gateway GW again, for validating the data counters DC and determining the amount of cross traffic. Probing the counters DC may simply refer to reading the counter values, but may, depending on the capabilities of the gateway GW, may also refer to obtaining other information from the gateway GW, including configuration data and data about the gateway's hard- and software.

UPnP offers great opportunities for home network measurements. UPnP is a set of protocols for home network devices to automatically discover one another and configure themselves. Hence, a software tool or application running on a network device connected to the home network can directly query the home gateway. For instance, a network device can query the manufacturer and the model of the home gateway to then pinpoint the particular devices that have oversized buffers. Oversized buffers may cause undesired effects in a network. As another example, network devices can obtain the capacity of the access link, i.e. the maximum transmission speed, and the volume of traffic traversing the gateway, which can help evaluate measured speeds. Information about and specifications of UPnP can be found under http://www.upnp.org.

A number of measurement tools MT can be used for measuring data traffic in networks, including, inter alia, Netalyzr and HomeNet Profiler. Information about Netalyzr is available e.g. from C. Kreibich, N. Weaver, B. Nechaev, and V. Paxson in: "Netalyzr: Illuminating the Edge Network", Proc. IMC, October 2010. HomeNet Profiler is discussed in L. DiCioccio, R. Teixeira, and C. Rosenberg: "Characterizing Home Networks With HomeNet Profiler", Technical Report CP-PRL-2011-09-0001, Technicolor, September 2011. Such tools allow, inter alia, for measuring end-to-end capacity, or speed, of a connection, and buffer delay resulting from buffers anywhere in the connection, e.g. in the gateway.

When the UPnP responses to queries directed to the gateway GW are accurate this data can be exploited for measurements and troubleshooting. E.g., UPnP data is used for determining the real access link capacity, i.e. up- and download speed, as compared to the link capacity reported by the gateway in response to a query. Measurements carried out show that the protocol overhead is around 14% in most home networks. It is also possible to analyze the packet losses occurring in the home network and in the wide area network by comparing the end-to-end measurements with the local information available at the UPnP enabled home gateways. Further, it is possible to determine the buffer sizes in different types and makes of gateways.

In accordance with the present invention data from the UPnP reports together with end-to-end measurements of a communication channel is used for determining the amount of cross-traffic, or unauthorized or unwanted traffic, from the home network traversing the gateway GW.

Experiments carried out in the frame of the present invention are based on data collected using the Netalyzr and HomeNet Profiler tools discussed further above. Both these tools run on a host computer D1 connected to the home network NW1 and perform a series of measurements. HomeNet Profiler runs Netalyzr to measure buffer delays, downlink and uplink capacities, and round-trip-times to a Netalyzr server D2 on the Internet NW2. The details of these measurements are explained in the Netalyzr reference cited further above.

In the following, basic UPnP behavior and the UPnP measurements in Netalyzr and HomeNet Profiler will be described.

UPnP service discovery includes two phases: device discovery and interface discovery. During the device discovery phase, a UPnP client issues a UDP multicast query to search for services. The query may either search for a specific UPnP service or use a wildcard to discover all available services.

Other devices implementing any of the requested services will answer after a short, random delay. The interface discovery phase uses unicast HTTP. For each device that answers the search query, the client reads an XML description file with the full list of implemented queries. The UPnP specification provides details on the semantics of these queries.

The present invention focuses on services offered by the home gateway GW. In accordance with the inventive method first a search for the 'WANCommonInterfaceConfig' service is carried out. Then, every device that responds is queried accordingly. In experiments carried out in the frame of the present invention four general gateway configuration parameters are collected: device model name and version, device WAN interface type, e.g. DSL, Cable, and connection physical rate, e.g. 10 Mbps/1 Mbps. For the present invention the gateway traffic counters DC are queried, which count the number of packets and/or bytes sent and received on the WAN interface I/F2. For testing the accuracy of these counters DC, they are queried immediately before and after sending a defined burst of packets to a server D2 on the Internet NW2. It is also possible to query the counters DC before and after a large download. For example, HomeNet Profiler sends 20 Internet Control Message Protocol (shortly ICMP) pings during a 10 seconds period, whereas Netalzyr tests counters before and after performing a bandwidth test.

In both cases the number and size of the packets in the burst is known. These values should largely correspond to the values provided by querying the gateway's traffic counters DC. In addition, HomeNet Profiler also queries the local traffic counters of the computer it is running on.

In order to obtain reliable results from the measurements the impact of protocol overhead, e.g. due to Point to Point Protocol (shortly PPP) encapsulation, must be taken into account. Often, the UPnP query reports the raw data rates, whereas Netalzyr measures gross IP traffic rates (IP standing for Internet Protocol).

In general, most Internet applications like web browsing or streaming of audio-visual content require a larger download bandwidth and a smaller upload bandwidth. Even with multiple applications or services running in the home network, the uplink bandwidth will be less affected than the downlink bandwidth and for that, the download measurements are more susceptible to be impacted by cross traffic. This result is consistent with statistical data about residential broadband Internet access in the United States, as shown by S. Sundaresan, W. de Donato, N. Feamster, R. Teixeira, S. Crawford, and A. Pescapè in "Broadband Internet Performance: A View From the Gateway" in Proc. ACM SIGCOMM, August 2011.

The measurement tool MT running on the home network device D1 attached to the home network NW1 can estimate the cross traffic from other network devices attached to the home network NW1 by querying the gateway's UPnP traffic counters DC. The HomeNetwork Profiler dataset includes data from both UPnP counters of the gateway GW and traffic counters in the local host. In an experiment carried out in the context of the present invention traffic counter measurements in a total of 446 gateways were carried out. In order to compensate for different access link capacities when comparing the data the number of bytes counted by the gateway GW, i.e. reported in response to queries to UPnP counters, is normalized. The same normalization is applied to the number of bytes sent by the local host.

Figures 7, 8:
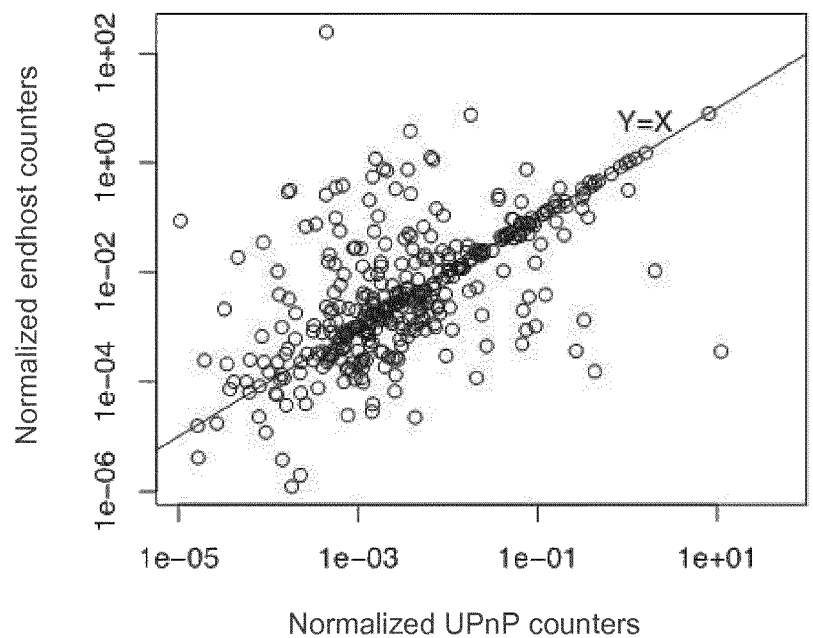
FIG. 7 shows exemplary data for data traffic originating from a network device running a method in accordance with the invention versus data traffic as reported from the gateway.
FIG. 8 shows statistical data about data loss at various points of a connection.

FIG. 7 plots the normalized traffic observed at the gateway GW on the x-axis versus the normalized traffic sent by the home network device D1 (endhost) in the y-axis. When x=y, the gateway GW and the home network device D1 observe the same traffic, which implies that there is no other traffic in the home network NW1 or to the Internet NW2. For points below the diagonal line, the gateway GW saw more traffic than the home network device D1, which indicates that other devices in the home network NW1 were sending traffic to the Internet NW2. For points above this line, the home network device D1 was sending traffic to other local destinations.

It is to be noted that the gateway's traffic counter DC only reports traffic to and from the WAN interface I/F2. This exemplary plot shows that in most of the home networks NW1 there was mainly local traffic, i.e. traffic from the home network device D1 to other devices in the home network NW1 during the measurements. This case accounts for 53% of the points in FIG. 7, whereas the case with cross-traffic from other devices to the Internet NW2 represents 37% of points.

FIG. 8 breaks down the location of packets losses in exemplary measurements. Correct traffic counter measurements for 412 home networks are considered. It was impossible to identify the location of losses in 24% of these home networks due to significant cross-traffic during the measurement. As a consequence the values in the table shown in FIG. 8 do not add up to 100%. No loss was found in only 4% of measurements. This result is expected because Netalzyr's capacity test sends a high rate of packets to fill the pipe, which induces loss. In 57% of tests, losses occur in the wide-area network NW2, possibly at the access link, but the exact location could not be pinpointed. In total, loss in the home network NW1 was observed in 24% of the tests. It is expected that well provisioned local networks will produce less loss.

The procedure in accordance with the invention can be repeated as appropriate in order to increase the reliability and robustness of the data, e.g. for avoiding erroneous measurements caused by counter overruns, and the like. For collecting and consolidating data from multiple runs of the method, an IP-Address or MAC-Address may be used to identify individual network devices.

The methods described in this specification allow for detecting and measuring the amount of cross traffic that is running in a home network NW1, specifically traversing the home gateway GW. These methods are particularly useful if the home gateway GW is not controlled or managed, i.e., no specific tool for such purpose is running on the gateway GW.

A further aspect of the invention using traffic counters DC in gateways GW pertains to problems caused by send and receive buffers. The common knowledge is that most end-to-end buffering occurs at the gateway GW, but there are many different places where buffering can occur: at the operating system on the end host D1 in the home network NW1, in wireless access points, or at any other equipment in the access link chain. Information obtained from the gateways using UPnP queries, together with measurements of upload capacity and round trip time, or RTT, under load can be used to infer the buffer sizes of individual gateway models. To avoid any bias in our due to buffering happening on the wireless link, it is appropriate to do this analysis only for measurements known to run over a wired link. The measurements made confirm that most current gateways have a fixed buffer size, irrespective of the uplink capacity. Ideally, the buffer size should be proportional to the uplink capacity, which determines the buffer draining rate. For a typical uplink rate of 1.2 Mbps, any buffers larger than around 150 KB will introduce more than one second delay under load, which is prohibitively large for interactive applications, e.g. for IP telephony or videophone applications. This delay would increase to 2.3 seconds for 512 Kbps uplink. UPnP queries can determine the true access link capacity, pinpoint cross-traffic from the home network, differentiate local from wide-area losses, and identify gateway characteristics per model.

All examples and conditional language recited herein are intended for pedagogical purposes to aid the read in understanding the principles of the invention and the concepts contributed by the inventor to furthering the art and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read only memory ("ROM") for storing software, random access memory ("RAM"), and non volatile storage. Other hardware, conventional and/or custom, may also be included.

It is to be understood that the present principles may be implemented in various forms of hardware, software, firmware, special purpose processors, or a combination thereof. Preferably, the present principles may be implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform may also include an operating system and microinstruction code. The various processes and functions described herein may either be part of the microinstruction code or part of the application program, or a combination thereof, that is executed via the operating system. In addition, various other peripheral devices may be connected to the computer platform such as an additional data storage device and a printing device.

It is to be further understood that, because some of the constituent system components and method steps depicted in the accompanying Figures are preferably implemented in software, the actual connections between the system components, or the process steps, may differ depending upon the manner in which the present principles is programmed. Given the teachings herein, one of ordinary skill in the related art will be able to contemplate these and similar implementations or configurations of the present principles.

The invention claimed is:

1. A method of locating packet loss in data traffic across a gateway device configured to connect a first network and a second network, the method comprising, at a first network device attached to the first network:

sending a first query to the gateway device, requesting a first information about a status of a data counter provided in the gateway device;
receiving the requested information;
transmitting a request to a second network device attached to the second network, triggering the second network device to send a defined amount of data;
receiving data in response to the request triggering the sending of the defined amount of data from the second network device, and counting an amount of data received from the second network device;
sending a second query to the gateway device, requesting a second information about the status of the data counter provided in the gateway device;
receiving the requested second information;
determining a data amount from a difference between the first and second information;
comparing the determined data amount with the defined amount of data requested from the second network device and with the amount of data received;
providing an indication that data loss in the first network was detected when the determined data amount is larger than the amount of data received by a predetermined amount of data; and
providing an indication that data loss in the second network was detected when the determined data amount is smaller than the defined amount of data by a predetermined amount of data;
wherein the first query is sent before the defined amount of data is requested and the second query is sent after the amount of data is received.

2. The method of claim 1, wherein the first network is a wired and/or wireless home network, and wherein the second network is the Internet.

3. The method of claim 1, wherein protocol for addressing the data counter in the gateway device is compliant with UPnP protocol.

4. The method of claim 1, wherein a link capacity value provided by the gateway device is compared to a measured end-to-end link capacity value to determine a reliability value of the data counter of the gateway device.

5. The method of claim 1, wherein a protocol-dependent overhead is taken into account when the data counter provides net data values rather than gross data values.

6. A first network device having a network interface, a microprocessor, a program memory and a data memory, wherein the first network device is configured to:

send a first query to a gateway device, requesting a first information about a status of a data counter provided in the gateway device;
receive the requested information;
transmit a request to a second network device attached to a second network, triggering the second network device to send a defined amount of data;
receive data in response to the request triggering the sending of the defined amount of data from the second network device, and count an amount of data received from the second network device;
send a second query to the gateway device, requesting a second information about the status of the data counter provided in the gateway device;
receive the requested second information;
determine a data amount from a difference between the first and second information;
compare the determined data amount with the defined amount of data requested from the second network device and with the amount of data received;

provide an indication that data loss in the first network was detected when the determined data amount is larger than the amount of data received by a predetermined amount of data; and provide an indication that data loss in the second network was detected when the determined data amount is smaller than the defined amount of data by a predetermined amount of data;

wherein the first query is sent before the defined amount of data is requested and the second query is sent after the amount of data is received.

7. The first network device of claim 6, wherein the gateway device further comprises:
   a first and a second network interface connected to the first and second networks, respectively, the first and second network interfaces being configured to provide a connection between the first and second networks;
   a microprocessor;
   a program memory; and
   a data memory, wherein the gateway device is configured to provide responses to queries from the first network device.

8. The first network device of claim 6, wherein the first network is a wired and/or wireless home network, and wherein the second network is the Internet.

9. The first network device of claim 6, wherein protocol for addressing the data counter in the gateway device is compliant with UPnP protocol.

10. The first network device of claim 6, wherein a link capacity value provided by the gateway device is compared to a measured end-to-end link capacity value to determine a reliability value of the data counter of the gateway device.

11. The first network device of claim 6, wherein a protocol-dependent overhead is taken into account when the data counter provides net data values rather than gross data values.

12. A system for monitoring data traffic across a gateway device, the gateway device connecting a first and a second network, said system comprising a first network device having a network interface, a microprocessor, a program memory and a data memory, wherein the first network device is configured to:
   send a first query to the gateway device, requesting a first information about a status of a data counter provided in the gateway device;
   receive the requested information;
   transmit a request to a second network device attached to the second network, triggering the second network device to send a defined amount of data;
   receive data in response to the request triggering the sending of the defined amount of data from the second network device, and count an amount of data received from the second network device;
   send a second query to the gateway device, requesting a second information about the status of the data counter provided in the gateway device;
   receive the requested second information;
   determine a data amount from a difference between the first and second information;
   compare the determined data amount with the defined amount of data requested from the second network device and with the amount of data received;
   provide an indication that data loss in the first network was detected when the determined data amount is larger than the amount of data received by a predetermined amount of data; and
   provide an indication that data loss in the second network was detected when the determined data amount is smaller than the defined amount of data by a predetermined amount of data;
   wherein the first query is sent before the defined amount of data is requested and the second query is sent after the amount of data is received.

13. The system of claim 12, wherein the gateway device further comprises:
   a first and a second network interface connected to the first and second networks, respectively, the first and second network interfaces being configured to provide a connection between the first and second networks;
   a microprocessor;
   a program memory; and
   a data memory, wherein the gateway device is configured to provide responses to queries from the first network device.

14. The system of claim 12, wherein the first network is a wired and/or wireless home network, and wherein the second network is the Internet.

15. The system of claim 12, wherein protocol for addressing the data counter in the gateway device is compliant with UPnP protocol.

16. The system of claim 12, wherein a link capacity value provided by the gateway device is compared to a measured end-to-end link capacity value to determine a reliability value of the data counter of the gateway device.

17. The system of claim 12, wherein a protocol-dependent overhead is taken into account when the data counter provides net data values rather than gross data values.

* * * * *